United States Patent
Yenisch et al.

(10) Patent No.: US 7,667,598 B2
(45) Date of Patent: Feb. 23, 2010

(54) METHOD AND APPARATUS FOR DETECTING PRESENCE AND RANGE OF A TARGET OBJECT USING A COMMON DETECTOR

(75) Inventors: William Yenisch, Longwood, FL (US); Richard Leblanc, Clermont, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 151 days.

(21) Appl. No.: 11/812,445

(22) Filed: Jun. 19, 2007

(65) Prior Publication Data
US 2008/0316026 A1 Dec. 25, 2008

(51) Int. Cl.
| | |
|---|---|
| G08B 13/18 | (2006.01) |
| G08B 21/00 | (2006.01) |
| G01S 13/08 | (2006.01) |
| G01S 13/58 | (2006.01) |
| G01C 3/08 | (2006.01) |
| G01C 21/02 | (2006.01) |
| G01V 8/00 | (2006.01) |

(52) U.S. Cl. ............... 340/555; 340/556; 340/557; 340/686.1; 342/105; 342/107; 342/118; 342/128; 342/134; 356/5.01; 356/5.09; 356/5.1; 250/206.1; 250/559.11; 250/559.13; 250/559.29; 250/559.38

(58) Field of Classification Search ......... 340/555–557, 340/686.1; 342/105, 107, 118, 128, 134; 356/5.01–5.09, 5.1; 250/559.11, 559.13, 250/559.29, 559.38, 206.1, 206.2
See application file for complete search history.

(56) References Cited

U.S. PATENT DOCUMENTS

| 3,688,313 | A | * | 8/1972 | Kern ........................... 342/97 |
| 3,733,129 | A | * | 5/1973 | Bridges .................... 356/5.09 |
| 4,744,653 | A | * | 5/1988 | Sano et al. .................. 356/5.1 |
| 5,408,541 | A | | 4/1995 | Sewell |
| 5,449,899 | A | | 9/1995 | Wilson |
| 7,535,555 | B2 | * | 5/2009 | Nishizawa et al. ......... 356/5.02 |

* cited by examiner

Primary Examiner—Benjamin C Lee
Assistant Examiner—Lam P Pham
(74) Attorney, Agent, or Firm—Buchanan Ingersoll & Rooney PC (57) ABSTRACT

A multifunction detector for detecting energy reflected from the surface, the detector comprising: a focal plane array in communication with the optical receiving path; and an optical receiving path; a read-only integrated circuit in communication with the optical receiving path, integrated with a focal plane array; and a processor programmed to operate the focal plane array and read-out integrated circuit in a first mode to process signals in a first frequency band, and in a second mode to process signals in a second, wider frequency band.

29 Claims, 4 Drawing Sheets

METHOD AND APPARATUS FOR DETECTING PRESENCE AND RANGE OF A TARGET OBJECT USING A COMMON DETECTOR

BACKGROUND

A multifunction detector is disclosed which can be part of a system for locating an object within a field of regard, and for determining the range to the object, wherein the detector can include multiple mode functionality, such as a focal plane array (FPA) function and a read-out integrated circuit (ROIC) function.

Active imaging systems transmit energy into the environment and determine the presence of an object based on its reflection of the transmitted energy. Objects in the environment, such as optical and electro-optical targets, retro-reflect the transmitted energy. Retro-reflecting objects have a small reflectance angle, so that incident energy will be reflected in approximately the same direction from which it is received.

An exemplary system which uses retro-reflected energy from objects in the environment to detect or image the object is described in U.S. Pat. No. 5,408,541 (Sewell). This patent discloses using a laser to image retro-reflecting targets once the target has been detected with radar or a thermal imaging sensor.

U.S. Pat. No. 5,449,899 (Wilson) discloses a target detector which receives retro-reflected laser energy from an optical target. The Wilson patent discloses that when a target is detected, a separate range-finder with separate optics and detector can be pointed in a direction identified by the target detector to determine a range to the target.

SUMMARY

A multifunction detector is disclosed for detecting energy reflected from an object, the detector comprising an optical receiving path; a focal plane array in communication with the optical receiving path; a read-out integrated circuit in communication with the optical receiving path, and integrated with the focal plane array; and a processor programmed to respond to outputs of the focal plane array and read-out integrated circuit in a first mode to process signals in a first frequency band, and in a second mode to process signals in a second, frequency band.

A method is disclosed for detecting a location (e.g., an azimuth and elevation), and range of an object within a field of regard. An exemplary method includes transmitting energy as an optical beam, such as a gated continuous wave, across the field of regard (e.g., illumination with a vertical scanning beam that is horizontally moved across the field of regard, or a raster-like scan); receiving energy reflected from an object within the field of regard via a first optical receiving path to determine a location of the object using a first detector operated in a first mode on a first frequency band; transmitting a pulsed optical beam of energy within the field of regard in response to determining the location of the object; and receiving energy of the pulsed optical beam reflected from the object via the first optical receiving path to determine a range of the object using the first detector operated in a second mode on a second, (e.g., wider and/or higher) frequency band.

An apparatus for detecting a location and range of an object within a field of regard, includes a first transmitter for transmitting energy as an optical beam, such as a gated continuous wave, across the field of regard; an optical receiving path for receiving energy of the optical beam reflected from the object; and a detector in optical communication with the optical receiving path for determining a location of the object within the field of regard and for determining a range of the object. A second transmitter is included for transmitting a pulsed optical beam within the field of regard in response to determining the location of the object. A processor is programmed to respond to outputs of the detector to detect the location of the object in a first mode by processing signals in a first frequency band, and to determine the range in a second mode by processing signals in a second, (e.g., wider and/or higher) frequency band.

An apparatus is disclosed for detecting a location (e.g., azimuth and elevation) and range of an object within a field of regard. Such an apparatus includes means for transmitting energy as an optical beam across the field of regard to determine a location of an object within a field of regard, and means for transmitting a pulsed optical beam within the field of regard in response to determining the presence of the object. Means are disclosed for receiving energy reflected from an object within the field of regard via a first optical receiving path. The apparatus includes means for determining the location of the object in a first mode by processing signals from the receiving means and the detecting means in a first frequency band, and means for determining a range to the object in a second mode by processing signals received via the receiving means and the detecting means in a second, frequency band, the range of the object being determined using the pulsed optical beam.

DETAILED DESCRIPTION

Figure 1:
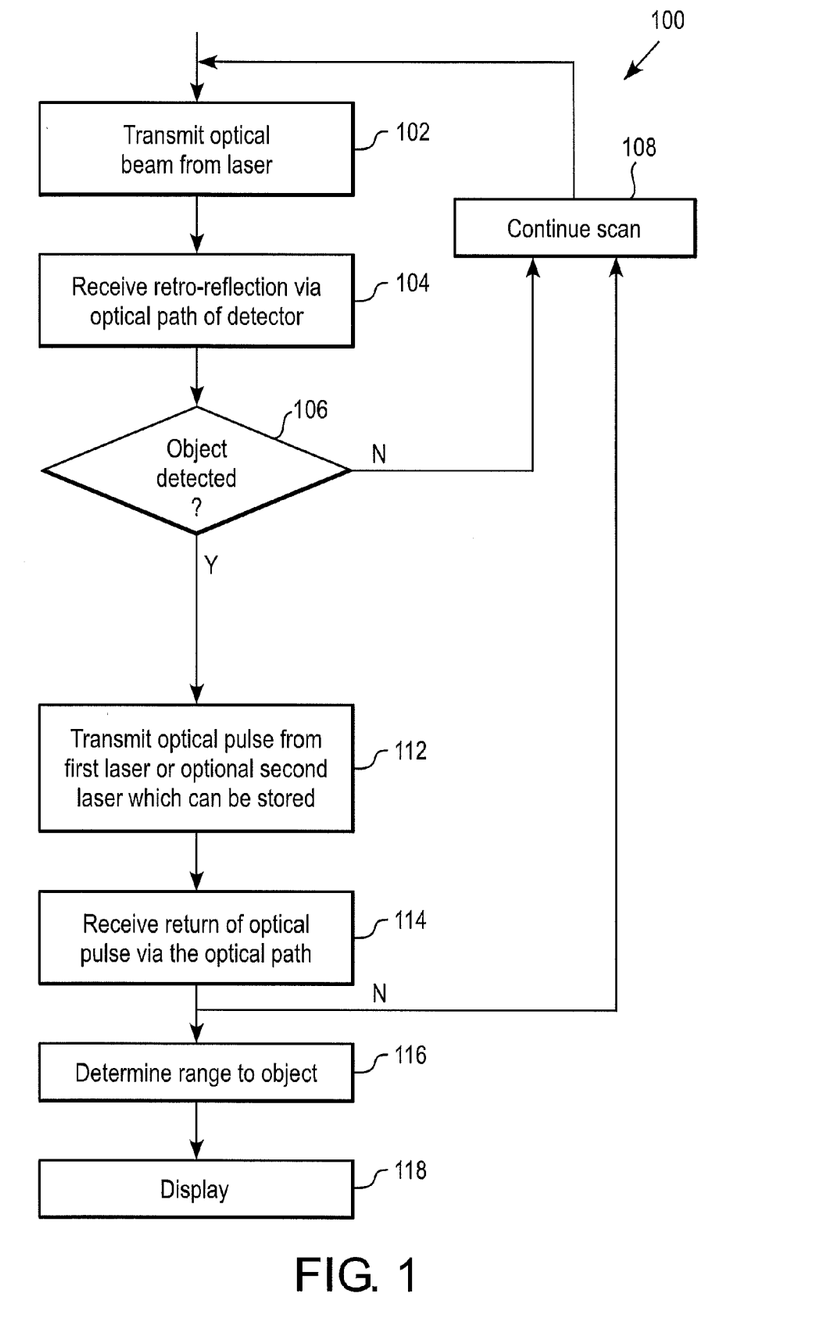
FIG. 1 illustrates a flow chart illustrating an exemplary operation of an apparatus as described herein.

FIG. 1 illustrates an exemplary method 100 of detecting a location (e.g., azimuth and elevation, or pitch) and range of an object within a field of regard wherein a multifunction detector includes multiple mode functionality, such as an integrated focal plane array (FPA) function and an integrated read-out integrated circuit (ROIC) function. A system including such a detector can be operated in multiple modes to, for example, identify/detect an object's presence and location (e.g., azimuth and elevation) and also to determine a range to the object. A processor associated with, or included in the detector, is programmed to respond to outputs of the focal plane array and read-out integrated circuit in a first mode to process signals in a first (e.g., narrower and/or lower) frequency band, and in a second mode to process signals in a second (e.g., wider and/or higher) frequency band relative to the first band. The processor can perform processing, such as double sample correlation (DSC) to analyze a return from the object during the detection process.

According to the method 100, a system transmits energy, such as an optical beam of a laser along a first direction within the field of regard in block 102 to illuminate a target object. The laser can be any type of suitable laser device including, but not limited to, a gated continuous wave laser beam. The laser can be a single laser which is used to illuminate the field of regard for purposes of determining the object's location, and which is then operated in a pulse mode to determine a range to the object. Alternately, the laser can include a first laser (e.g., CW laser) which is dedicated to the location detection, and a second laser (e.g., pulse laser) dedicated to range detection. Regardless of whether one or multiple lasers are used, exemplary embodiments include a single (e.g., common) optical receiving path for receiving optical energy that can be used by the multifunction detector to determine both object location and object range.

The optical beam used for both object location and range detection can be transmitted at any suitable frequency (wavelength) for detecting retro-reflections including, but not limited to infrared frequencies. Alternately, a first frequency (wavelength) can be used for object location detection and a second frequency (wavelength) can be used for range detection, provided the multifunction detector is configured to receive reflections of the frequencies used for both object location and range detection. Where the optical beam used for location detection is a gated continuous wave optical beam transmitted during specified intervals, little or no energy is transmitted between intervals. If the optical beam reaches an object having a retro-reflecting surface, for example, an optical or electro-optical target, retro-reflected energy is received via the optical path of the multifunction detector in block 104. Those skilled in the art will appreciate that such a beam can be selected of sufficient amplitude (e.g., by way of empirical data) to be distinguishable from anticipated noise, such as reflections off the atmosphere.

Reflections received via the optical receiving path in block 104 are input to a focal plane array and a read-out integrated circuit of the multifunction detector. The multifunction detector can be any suitable device which is responsive to the retro-reflected optical beam. For example, the detector can include an integrated quantum well based focal plane array and a read-out integrated circuit with processing that implements double sample correlation (e.g., compares a laser "on" condition to a laser "off" condition) to identify differences as an indication of a retro-reflector in the field of regard. Using a focal plane array, an orientation of the energy reflected from the retro-reflecting surface can be determined based on the location at which the energy impacts the array. The multifunction detector can include components (e.g., FPA photodiodes and ROIC preamplifiers) which span a bandwidth sufficient to accommodate the location detection laser frequency and a relatively higher frequency, wider bandwidth narrow pulse return of the range detection laser frequency. Thus, regardless of whether two separate lasers are used, the FPA and ROIC can be configured to be responsive to frequencies (wavelength) used for location and range detection.

Using common optics of the same optical receiving path, a signal received with the laser being turned on can be compared against a signal received when the laser is off. Spatial differences between the reflected and passive scene waveforms being sampled can then be used to identify an existence of a retro-reflector in the field of regard. For example, the system can compare an unilluminated scene with a laser illuminated scene to highlight the presence of the detector in the field of regard. The focal plane array can, for example, be an InGaAs FPA operating at room temperature, or an InSb detector (e.g., for detecting infrared (IR) wavelengths in, for example, the 3-5 μm band, or lesser or greater).

Thus, multiple (e.g., successive) signals representing reflected energy received at the detector can be compared to perform a target object detection via the continue scan block 108. If the difference between these signals (e.g., between two or more successive signals) is greater than an established detection threshold, then it can be concluded that a retro-reflecting object is present at a coordinate location in the field of regard which is determined as a function of the direction from which the reflected energy was received, as represented in block 106.

When a detection (e.g., amplitude) threshold is exceeded on a location of the FPA, a range detection can be performed. A ranging pulse can then be transmitted in block 112 toward the location in the field of regard at which the target was detected. Where the same laser which transmitted the beam in block 102 is used to transmit a ranging pulse in block 112, no steering of the laser is necessary. However, where a separate, second laser is used to transmit a ranging pulse, the direction in which the pulse is transmitted may, for example, be steered as a function of the detected object location. Such steering can be performed using any available steering means (e.g., any mechanical and/or electrical drive for pointing the second laser).

In an exemplary embodiment, the ranging pulse is transmitted within a ranging interval, during which the first laser is not transmitting into the field of regard. Thus a ranging pulse can be transmitted during a ranging interval, at a time between the specified optical beam transmission intervals, during which little or no energy is otherwise transmitted.

The ranging pulse can be generated in any suitable manner. The range finding operation can, for example, be performed during an interval following a trailing (e.g., falling) edge of a continuous wave (CW) laser waveform. An optical pulse can be generated by a pulse laser for use in range finding.

In an exemplary embodiment, the ranging pulse can have a duration which is substantially less (e.g., an order of magnitude, or lesser or greater) than the off cycle of the CW laser, and can be such that spectral content of the pulse (e.g., MHz) is detectably different than the emission of the CW laser. The ranging pulse can be transmitted during the ranging interval; for example, during the interval between successive transmissions of the optical beam, The pulse can be transmitted as a narrow pulse of high frequency content. Those skilled in the art will appreciate that a narrower pulse can be used to provide increased range resolution.

In an exemplary embodiment, when a detection threshold is exceeded within a given location of the FPA, the ranging pulse is transmitted during the next available ranging interval, so that little or no additional steering of one or more of the detector array, laser, or the optics is performed. Rather than awaiting ranging laser pointing, a ranging pulse can be immediately transmitted.

The multifunction detector receives the return of the ranging pulse via the optical receiving path in block 114. Because the same optical path that was used to receive energy for detecting the object location is used for range detection, the position of the multifunction detector in which the object's location was identified can be examined during the ranging operation to detect the return of the ranging pulse. For example, a multiplexer included with the multifunction detector can be addressed to select an output from a given location (or locations) of the FPA at which the object's location was detected. By addressing this output location, the energy received can be examined subsequent to transmission of the optical pulse to look for the pulse return. The range to the retro-reflecting object can be determined in block 116 based on the time delay in receiving the return of the optical pulse. A display function in block 118 can then be used to show the location, range of the object, time at detection, and any desired settings or characteristics of the detection system.

The multifunction detector can be sensitive to wavelengths of the transmitted continuous wave optical beam and the optical pulse.

The ranging detection can be performed by an addressable one of a plurality of detector elements in the focal plane array. The focal plane array can be integrated with the read-out integrated circuit, and a preamplifier can be included in the ROIC for each of the FPA detector elements. A multiplexer capable of selecting a specified output for any of the individual FPA detector elements can include a channel for each of the preamplifiers. The focal plane array can be any suitable optical sensing device, and in an exemplary embodiment, is a 1×512 pixel linear focal plane array of photodiodes or other photosensitive devices. The focal plane array can also be a linear focal plane array having a small number of adjacent detector elements (e.g., pixels) whose output can be averaged or otherwise combined. The linear focal plane array can be scanned to create a two dimensional field of regard. The focal plane array can be alternately configured as a two-dimensional array of any desired dimension.

In an exemplary embodiment, a vertical optical beam used for object location detection is scanned across the field of regard in one direction (for example, horizontally), and the focal plane array has its long dimension in another direction (for example, vertically). In this manner, a vertical array of pixels define an instantaneous field of view in a vertical direction for a vertical line of detector elements where a laser having optics for creating a vertical line is used as an illuminator. The horizontal scan of the vertical line defines the field of regard. The focal plane array can also be arranged with its long dimension in other than a vertical direction, with the scanning direction being oriented at 90 degrees to the long dimension of the focal plane array.

The scanning of the optical beam, and/or the focal plane array can be accomplished by any known means for scanning. For example, scanning can be accomplished using a means, such as a drive motor, for rotating at least a portion of the system that contains the laser used for object illumination, and/or the detector (e.g., the linear focal plane array). For example, a mirror which rotates through any angle up to 360 degrees can be included. In an exemplary embodiment, the mirror rotates through an angle of about 180 degrees. Alternately, for example, the entire laser apparatus can be rotated through the desired scan angle.

Figure 2:
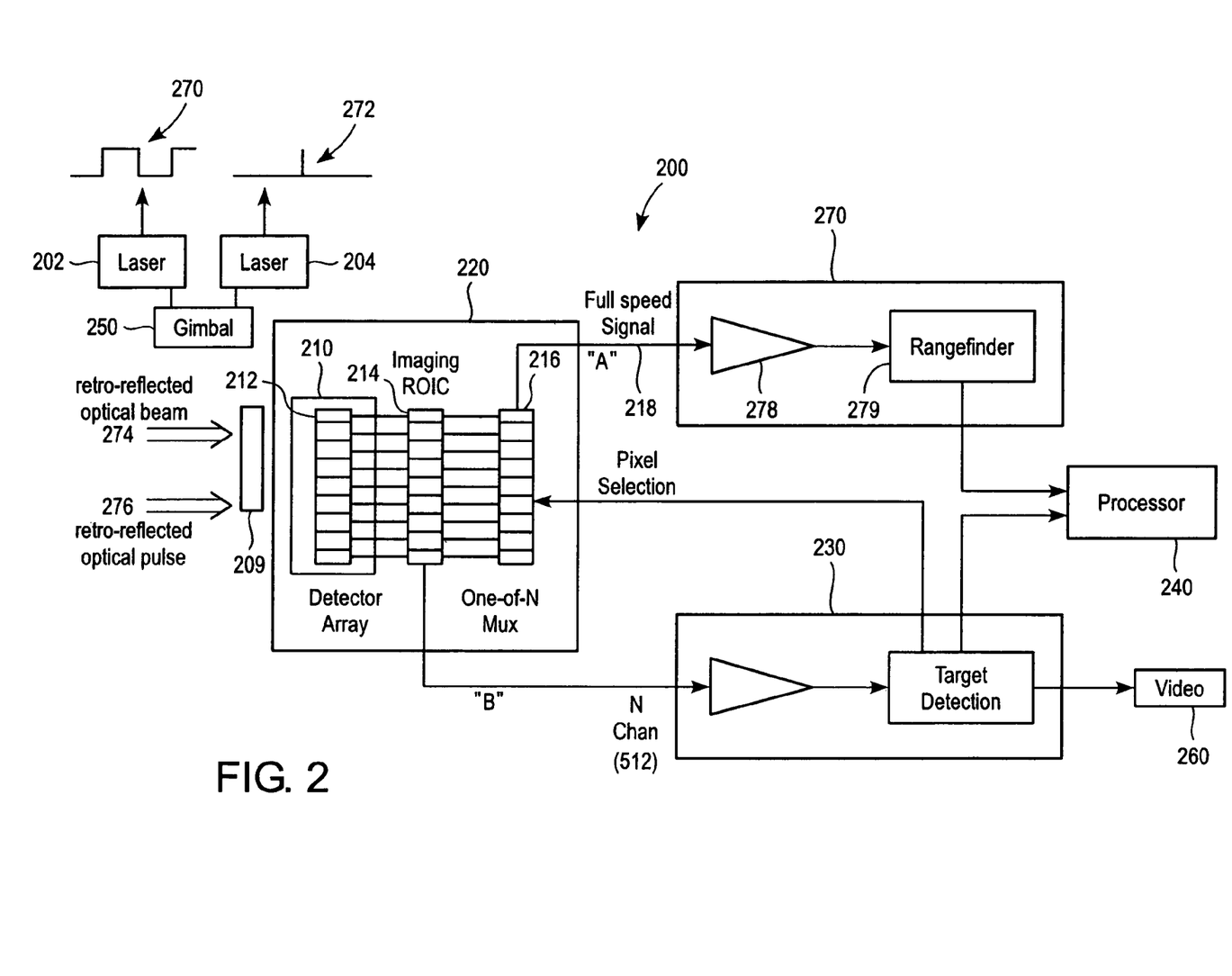
FIG. 2 illustrates an apparatus for detecting location and range to an object according to an exemplary embodiment.

FIG. 2 illustrates schematically an apparatus, or system, 200 having a multifunction detector and common receiving path as described herein for determining a location of an object within a field of regard during a first mode of operation, and for determining a range to the object during a second mode of operation. The apparatus is adapted to detect objects, such as those which have retro-reflective surfaces.

The multifunction detector 220 can include an optical receiving path 209, containing any desired optics and/or waveguide, in conjunction with an FPA and ROIC to determine the presence and location of the object within the field of regard during a first mode of operation, and also to determine a range to the object during a second, mode of operation. The same detector element (such as a pixel in a focal plane array) of which the object's location was detected in the first mode can be used to determine range in the second mode. Alternately, a second detector element (such as a second pixel) having a fixed relationship to a first detector element (at which an object's location was detected), can be used to determine object range. For example, the second pixel can be a predetermined number of pixels away from the first pixel.

In an exemplary embodiment, the detector 220 includes focal plane array 212 and associated (e.g., integrated) read-only integrated circuit 214. The focal plane array can include one or more elements, such as a photo sensitive transistor pair, or other device responsive to frequencies (wavelengths) used for both the optical beam and the optical pulse. The focal plane array which includes the plurality of detector elements can be coupled with the integrated read-out integrated circuit 214. In an exemplary embodiment, the multifunction detector includes 512 detector elements in a 1×512 linear focal plane array, 512 preamplifiers within ROIC 214, and two 512 channel multiplexers 216.

The ROIC can include a number of preamplifiers corresponding to each of the detector elements in the focal plane array 212. The read-out integrated circuit 214 can include an imaging channel and a pulse channel multiplexer that can be used for addressing each of the preamplifiers and thereby gate a specific output (or outputs) of the FPA to a rangefinder. The rangefinder determines the time interval between transmission of a ranging pulse and receipt of a return, and outputs a range determination. Each of the plurality of channels in the multiplexer 216 is thus associated with one of the preamplifiers. The range to the object can be determined by the time between the transmitted optical pulse being generated by the pulse laser 204 and the return from the optical pulse being detected.

In the FIG. 2 embodiment, a first transmitter 202 is provided for transmitting energy as an optical beam across the field of regard. The apparatus 200 includes the at least one focal plane array 212 having one or more energy (e.g., light energy) sensitive elements 210, and an associated read-out integrated circuit 214. As already mentioned, the first transmitter can be operated in a second mode to transmit an optical energy pulse. For example, a laser with a mode lock capability (e.g., mode locked with a pockel cell or electro-optical modulator, or other suitable device) can be used to transmit an optical beam in one mode, and can be mode locked to transmit an optical pulse in a second mode. Alternately, an optional second transmitter 204 can be provided for transmitting an optical energy pulse within the field of regard in response to determining the location (e.g., azimuth and elevation) of the object.

A means, such as an optical receiving path, is provided for receiving energy reflected from an object within the field of regard via a first optical receiving path. In an exemplary embodiment, the processor 240 is programmed to operate the focal plane array and read-out integrated circuit in a first mode to process signals in a first frequency band, and in a second mode to process signals in a second (e.g., wider and higher) frequency band.

The first transmitter 202 can be any type of suitable transmitter for generating an optical beam. For example, the first transmitter 202 can be a gated CW laser, producing a gated continuous optical beam. The optical beam generated by the first transmitter 202 can have a transmitting interval and a ranging interval, wherein little or no optical energy is transmitted by the first transmitter 202 during the ranging interval.

In operation, the photosensitive elements in the focal plane array are each available to receive retro-reflected energy. The photosensitive elements and preamps can be wide band to also respond to the laser pulse, and can be low noise for optimal target object detection. When optical energy is received, the photosensitive elements of the focal plane array 212 in conjunction with the preamplifiers 214 of the ROIC each generate an electrical voltage corresponding to the amount of energy received at each detector. The amplified voltage is transmitted to a target detection subsystem 230.

The target detection subsystem 230 can use a double sample correlation (DSC) detection process to determine whether a retro-reflection having an energy sufficient to indicate a target is present. An integration process collects photons over the sensitive optical waveband first during the illuminated state and secondly during the passive state. The target detector subsystem 230, which can be configured as part of the ROIC can include a double sample correlator (DSC) for each channel of the multifunction detector. A channel can be associated with each photosensitive element, or with each selected group of photosensitive elements when outputs are, for example, averaged. The DSC compares the reflected signal received in response to illumination of a target area due to transmission of the optical beam, with the energy level corresponding to a time interval when little or no optical energy is transmitted or received. If the difference in energy level detected within any given channel is greater than a given detection threshold, a processor 240 stores the physical address of a multiplexer associated with the channel that received the optical energy.

The physical address of the multiplexer associated with a detector element 210 that received energy above a threshold level corresponds to a location (azimuth and elevation) of the object within the field of regard, such as a two-dimensional coordinate for the object on the FPA. The same optical receiving path and detector element 210 which received the reflections from the optical beam is then used to detect receipt of the returned optical pulse during a ranging mode.

During a ranging mode, the first (or optionally, a second) transmitter 204 transmits the wider band optical pulse in the direction of the object detected. The reflected optical pulse is received via the optical receiving path by a detector element 210 of the focal plane array 212, and the detector 210 generates an electrical voltage responsive to the received optical pulse, which is amplified by a corresponding preamplifier within the ROIC 214. The output of a specified preamplifier 214 is selected via a multiplexer 216 which is addressed by the target detection subsystem, and the multiplexed signal is transmitted to a range finding subsystem 270.

A range finding subsystem 270, under control of the processor 240, determines the range to the target by computing the difference between the transmitted time of the optical pulse and the received time of the returned pulse. A display 260 can be provided to illustrate the two-dimensional location as well as the range of the object.

Figure 3:
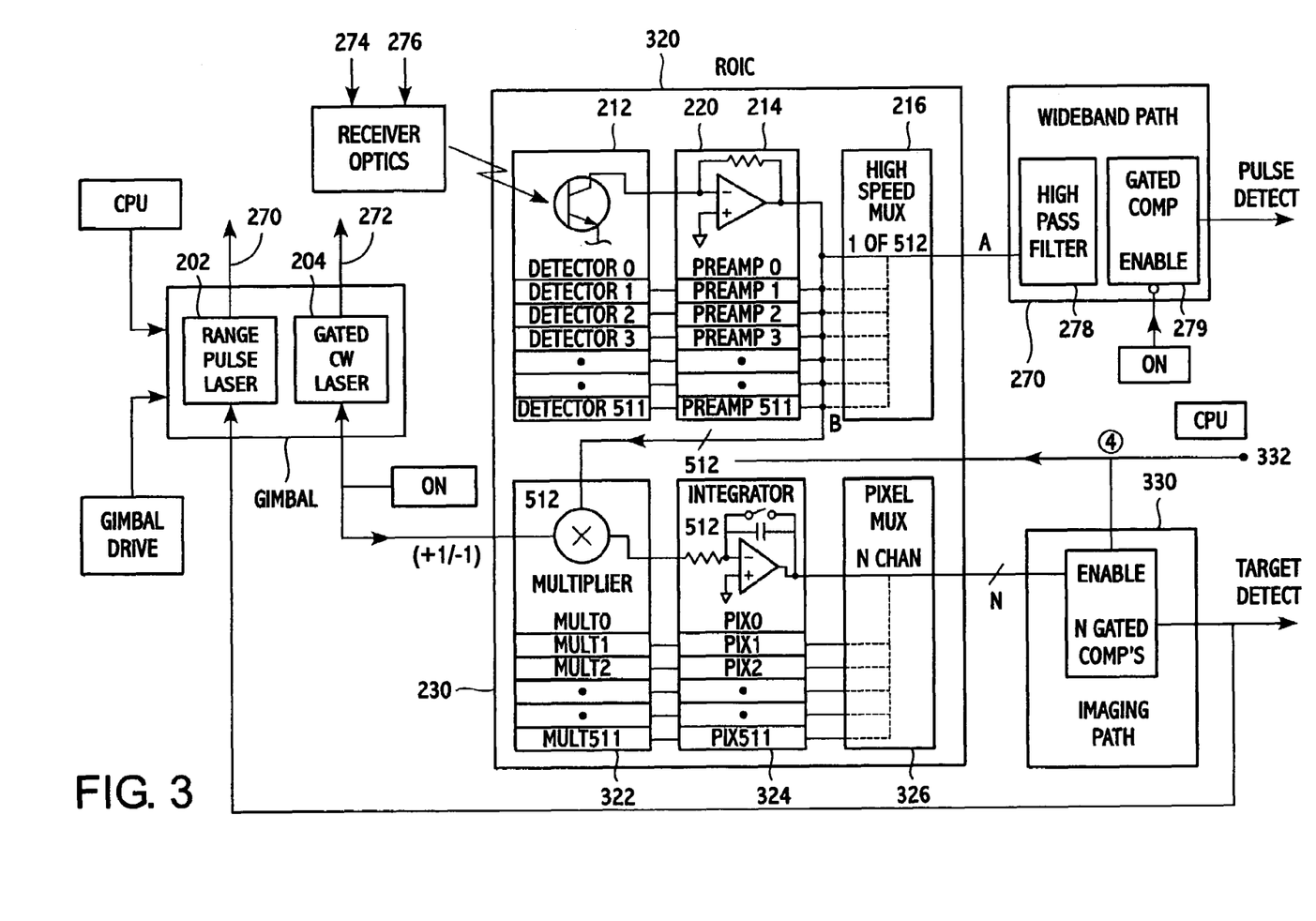
FIG. 3 illustrates an apparatus for detecting the location and range to an object according to another exemplary embodiment.

The range finding subsystem 270 includes a high pass filter 278 and a gated comparator 279. The pulse detection subsystem 270 receives on the FIG. 2 channel "A" a signal which can correspond to either the retro-reflected optical beam 294 or the returned optical pulse 276 via optical receiving path 209. The optical pulse return signal 218 is gated by the multiplexer only during the interval when the illumination laser is off. The high pass filter 278 reduces an effect of the target object identification response to the retro-reflected optical beam during the object location mode, and the effect of scan movement induced scene content. The gated comparator 279 receives the signal corresponding to the reflected optical pulse 276 for processing the range to the object FIG. 3 illustrates an embodiment of an apparatus having an FPA/ROIC integrated target object detection processor. In FIG. 3, the ROIC 320 can include the focal plane array 212, preamplifiers 214, and high speed multiplexers 216, as well as the components of the target detection subsystem 230, including a DSC scene processor comprised of sign changer multipliers 322, integrators 324, and pixel multiplexers 326 for each channel. In an exemplary embodiment, each of the multipliers 322, the integrators 324, and the multiplexers 326 have a number of channels corresponding to the number of detector elements 210, the number of preamplifiers 214, and the number of channels in the high speed multiplexer 216.

The output of each preamplifier 214 is transmitted through channel B to the multiplier 322. The output of each channel of the multipliers 322 is input to the integrator 324. The control signal DUMP 332 begins the integration of the integrator 324 and also enables the gated comparators 330. The integrators 324 produce analog outputs which can be routed via one or more multiplexers to one or more comparators. Those skilled in the art will appreciate that digital circuits can of course be used in place of any analog circuitry.

Together, the multipliers 322 and the integrators 324 form the double sample correlator which compares the output of the preamplifier during a transmitting interval of the continuous wave laser to the output of the preamplifier during the period when the continuous wave laser is not transmitting. The gated comparators 330 compare the output of the multiplexed integrated signal with a detection threshold for each detector. If the signal exceeds the threshold, the processor indicates that a target has been detected at a given location within the FPA that is then used for a ranging detection.

Figure 4:
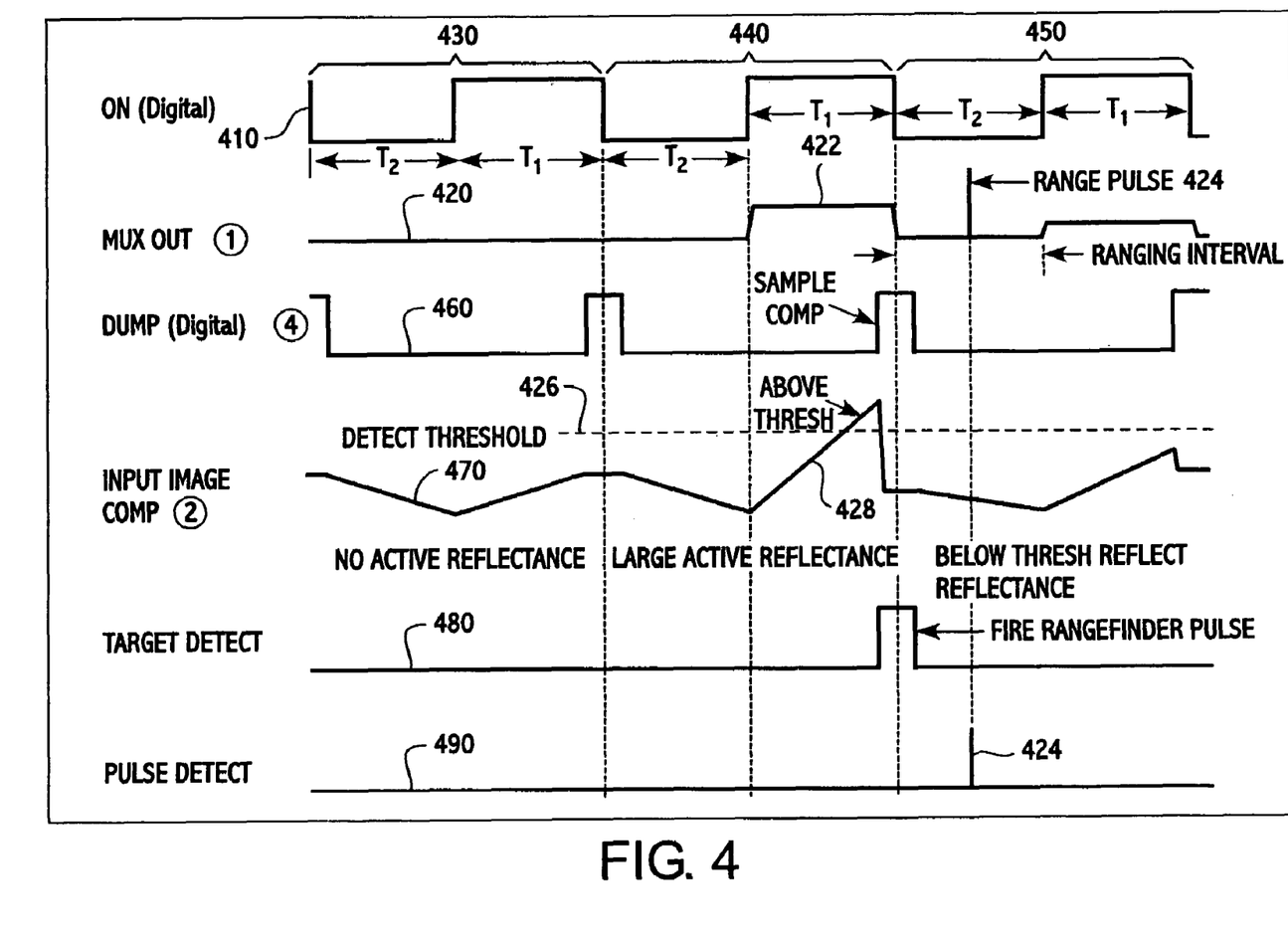
FIG. 4 illustrates a time sequence of responses according to another exemplary embodiment.

Additional exemplary features and functions of the apparatus 300 are illustrated by way of FIG. 4, which illustrates a representative time sequence of responses of the apparatus according to an exemplary embodiment. The first trace 410 represents a control signal which gates the continuous wave illumination laser 204 that transmits an optical beam during a first mode of operation. The optical beam is transmitted by transmitter 204 for a time period T1, and is prevented from transmitting by any suitable means, for a time period T2. The time period T2 is a ranging interval during a second mode of operation in which the ranging pulse is transmitted by a pulsed laser. The low-pass filter formed by the integrator limits the response to any optical pulse returns which may occur during this interval.

The second trace 420 in FIG. 4 illustrates the output signal of the high speed multiplexer 216 of FIGS. 2 and 3 for one channel.

Third trace 460 is the digital DUMP signal used to begin a new integration cycle and to enable comparison function.

During the first cycle 430 of T2 and T1 intervals in the first trace 410, the output of the multiplexer 216 is zero as shown in the second trace 420. The second trace 420 illustrates a frequency spectral content signal 422 which corresponds to energy received at a detector during the second interval 440.

The interval 450 of the first trace illustrates transmission of a ranging pulse 270 by the ranging pulse laser 202 after detection of energy above a threshold in a specific location of the FPA during the second interval 440.

An integrated narrow band signal corresponding to the retro-reflected continuous wave illumination beam 272 is illustrated in the fourth trace 470 of FIG. 4. The input to the FIG. 2 multiplexer 216 contains both narrow band and wide band signal components. During the interval 430 of the first trace, no active reflectance is detected (the signal is lower than the detection threshold 426).

As a result, the output of the gated comparator 330 is zero, as seen in the fifth trace 480 of FIG. 4. During the second interval 440 in FIG. 4, a detector detects a large active reflectance (the trace 470 is above the detection threshold 426). For example, during the period when the continuous wave laser is transmitting (T1 of interval 440), the non-zero signal 422 (see FIG. 4) is transmitted to the multiplier 322 and integrator 324.

The resulting integrated signal 428 exceeds the detection threshold 426. The slope of the trace of the signal 428 in FIG. 4 can be an indication of the strength of the retro-reflected signal.

At the time when the detection threshold is exceeded, the processor controls the range pulse laser 204 so as to transmit the range pulse 272 in a direction toward the target detected by the target detection subsystem. In an exemplary embodiment, the range pulse laser 204 transmits the ranging pulse before any additional gated optical beams are transmitted, e.g., during the subsequent ranging interval T2 in interval 450.

As illustrated in the fifth and sixth traces 480 and 490 in FIG. 4, the range pulse is transmitted and received during the period in which the continuous wave laser is "OFF" (the ranging interval T2 in interval 450). When the pulse detection subsystem detects the returned pulse, the range to target can be determined by the time between the transmitted pulse and the received pulse. The sixth trace 424 in FIG. 4 illustrates the output of a high pass filter, such as high pass filter 278, in which only the narrow band signal 424 is output to the pulse detection threshold comparator. The high pass filter 278 rejects unwanted low frequency scene components while propagating the higher frequency spectral content of the retro-reflected optical pulses.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for detecting a location and range of an object within a field of regard, comprising:
   transmitting energy as a continuous optical beam across the field of regard;
   receiving the energy of the continuous optical beam reflected from an object within the field of regard via a first optical receiving path to determine a location of the object using a first detector operated in a first mode on a first frequency band;
   transmitting a pulsed optical beam of energy within the field of regard in response to determining the location of the object; and
   receiving energy of the pulsed optical beam reflected from the object via the first optical receiving path to determine a range of the object using the pulsed optical beam and using the first detector operated in a second mode on a second frequency band.

2. The method according to claim 1, wherein the continuous optical beam is a gated continuous wave laser beam.

3. The method according to claim 1, wherein the determining the location of the object includes determining a two coordinate location of the object within the field of regard.

4. The method according to claim 1, wherein the determining the location of the object includes receiving a retro-reflected energy level at the first detector.

5. The method according to claim 1, wherein the determining the location of the object includes comparing a detected retro-reflected energy level corresponding to the transmitted optical beam with a detected energy level corresponding to a period when the optical beam is not transmitted.

6. The method according to claim 3, comprising:
   assigning an address corresponding to the two coordinate location of the object within the field of regard.

7. The method according to claim 3, comprising:
   pointing said pulsed optical beam in a direction of the two coordinate location according to the assigned address.

8. The method according to claim 1, wherein the pulsed optical beam is transmitted during an interval between gated transmission of the optical energy beam.

9. The method according to claim 8, wherein the duration of transmission of the pulsed optical beam is substantially less than a duration of transmission of the optical energy beam, such that the spectral content is wide band compared to the spectral content of the illumination laser beam.

10. The method according to claim 1, wherein determining a location of the object within the field of regard using the first detector comprises determining that a detecting threshold is exceeded.

11. A method according to claim 1, comprising:
    storing an address of the first detector subsequent to determining a presence of the object within the field of regard using the first detector; and
    supplying the address for the optical energy pulse.

12. An apparatus for detecting a location and range of an object within a field of regard, comprising:
    a first transmitter for transmitting energy as a continuous optical beam across the field of regard;
    a second transmitter for transmitting a pulsed optical beam within the field of regard in response to determining a location of the object; and
    an optical receiving path through which energy of the optical beam reflected from the object passes;
    a detector, in optical communication with the optical receiving path, receives energy of the optical beams and generates corresponding signals for determining a location of the object within the field of regard and determining a range of the object; and
    a processor programmed to respond to outputs of the detector to detect the location of the object in a first mode by processing reflected continuous optical beam signals in a first frequency band, and to determine the range in a second mode by processing reflected pulsed optical beam signals in a second, wider frequency band.

13. The apparatus according to claim 12, wherein the detector includes at least one of:
    a photosensitive pixel; and
    a first photosensitive pixel in an array of photosensitive pixels and a second photosensitive pixel in the array having a fixed spatial relationship to the first pixel.

14. The apparatus according to claim 12, wherein the first transmitter is a gated continuous wave laser and the optical beam is a gated continuous laser beam.

15. The apparatus according to claim 12, wherein the detector is a laser diode and photosensitive transistor pair.

16. The apparatus according to claim 12, comprising:
    an integrated circuit having a plurality of detector elements, a plurality of preamplifiers associated with the detector elements, and a multiplexer having a plurality of channels associated with the preamplifiers,
    the detector elements and the preamplifiers being responsive to optical energy at wavelengths of the optical beam and the pulsed optical beam.

17. The apparatus according to claim 12, wherein the channels of the multiplexer are in operative communication with a rangefinding channel.

18. The apparatus according to claim 12, wherein the processor receives a signal on a detector element which indicates the presence of an object and generates an address of the detector element.

19. The apparatus according to claim 18, wherein the processor transmits the address to the second transmitter for steering the pulsed optical beam.

20. An apparatus for detecting a location and range of an object within a field of regard, comprising:
- means for transmitting energy as a continuous optical beam across the field of regard to determine a location of an object within a field of regard;
- means for transmitting a pulsed optical beam within the field of regard in response to determining the location of the object;
- means for receiving energy reflected from an object within the field of regard via a first optical receiving path;
- detecting means connected to the receiving means to generate corresponding signals; and
- means for determining the location of the object in a first mode by processing reflected continuous optical beam signals from the receiving means and the detecting means in a first frequency band, and for determining a range to the object in a second mode by processing reflected pulsed optical beam signals received via the receiving means and the detecting means in a second, wider frequency band.

21. The apparatus according to claim 20, wherein the means for determining determines a two coordinate location of the object within the field of regard.

22. The apparatus according to claim 20, wherein the detecting means comprises:
- a detector responsive to retro-reflected optical energy.

23. The apparatus according to claim 20, wherein the means for determining comprises:
- means for comparing a detected retro-reflected energy of the transmitted optical beam with a detected energy level corresponding to a period when the optical beam is not transmitted, to determine a location of the object.

24. The apparatus for according to claim 20, comprising:
- means for assigning an address corresponding to a two coordinate location of the object within the field of regard.

25. The apparatus according to claim 24, comprising:
- means for pointing said pulsed optical beam in a direction of the two coordinate location according to the assigned address.

26. The apparatus according to claim 20, wherein the optical energy pulse is transmitted during an interval between transmission of subsequent optical energy beams.

27. The apparatus according to claim 26, wherein a duration of transmission of the pulsed optical beam is less than a duration of transmission of the optical energy beams.

28. The apparatus according to claim 20, wherein determining a presence of the object within the field of regard using the detecting means comprises determining that a detecting threshold is exceeded.

29. A apparatus according to claim 20, comprising:
- means for assigning an address corresponding to the two coordinate location of the object within the field of regard subsequent to determining a presence of the object within the field of regard using the detecting means and supplying the address for pointing the pulsed optical beam.

* * * * *